United States Patent
Axmon et al.

(10) Patent No.: US 10,419,974 B2
(45) Date of Patent: Sep. 17, 2019

(54) RANDOM ACCESS HANDLING IN SINGLE FREQUENCY NETWORK WITH UNIDIRECTIONAL ANTENNA NODE ARRANGEMENT

(71) Applicant: Telefonaktiebolaget LM Ericsson (publ), Stockholm (SE)

(72) Inventors: Joakim Axmon, Kavlinge (SE); Magnus Larsson, Sollentuna (SE); Oskar Mauritz, Johanneshov (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 151 days.

(21) Appl. No.: 15/313,449

(22) PCT Filed: Feb. 15, 2016

(86) PCT No.: PCT/EP2016/053105
§ 371 (c)(1),
(2) Date: Nov. 22, 2016

(87) PCT Pub. No.: WO2017/080681
PCT Pub. Date: May 18, 2017

(65) Prior Publication Data
US 2017/0289834 A1    Oct. 5, 2017

Related U.S. Application Data

(60) Provisional application No. 62/252,629, filed on Nov. 9, 2015.

(51) Int. Cl.
*H04W 28/16* (2009.01)
*H01Q 21/12* (2006.01)
(Continued)

(52) U.S. Cl.
CPC ............ *H04W 28/16* (2013.01); *H01Q 21/12* (2013.01); *H01Q 25/02* (2013.01);
(Continued)

(58) Field of Classification Search
CPC ... H04W 28/16; H04W 56/001; H04W 72/04; H04W 74/004; H04W 74/0866;
(Continued)

(56) References Cited

U.S. PATENT DOCUMENTS 5,930,721 A    7/1999    Fried et al.
9,325,389 B2    4/2016    Yu
(Continued)

FOREIGN PATENT DOCUMENTS

WO    2012130270 A1    10/2012

OTHER PUBLICATIONS

PCT International Search Report, dated Jan. 3, 2017, in connection with International Application No. PCT/EP2016/074459, all pages.
(Continued)

*Primary Examiner* — Matthew C Sams
(74) *Attorney, Agent, or Firm* — Leffler Intellectual Property Law, PLLC

(57) ABSTRACT

A network node is connected to a plurality of antenna nodes that are located along a constrained path where a plurality of wireless communication devices are located. The antenna nodes are controlled to maintain reception radio lobes substantially along the path such that the wireless communication devices can perform uplink radio communication with the network node via the reception radio lobes. At least one RF signal is detected in a PRACH, with a first PRACH configuration. A determination is made of a radio frequency offset of the detected RF signal. A determination is then made that the at least one RF signal originates from a wireless communication device of a specific subset among
(Continued)

the plurality of wireless communication devices. Each wireless communication devices in the specific subset is associated with the radio frequency offset. A second PRACH configuration that is common to all wireless communication devices in the specific subset of wireless communication devices is then provided to the wireless communication device.

17 Claims, 12 Drawing Sheets

(51) Int. Cl.
*H01Q 25/02* (2006.01)
*H04W 72/04* (2009.01)
*H04W 56/00* (2009.01)
*H04W 74/00* (2009.01)
*H04W 74/08* (2009.01)

(52) U.S. Cl.
CPC ......... *H04W 56/001* (2013.01); *H04W 72/04* (2013.01); *H04W 74/004* (2013.01); *H04W 74/0833* (2013.01); *H04W 74/0866* (2013.01); *H04W 72/048* (2013.01)

(58) Field of Classification Search
CPC . H04W 74/0833; H04W 72/048; H04W 4/70; H04W 72/0413; H04W 72/042; H04W 72/0466; H04W 72/0453; H04W 74/006; H04W 74/0875; H01Q 25/02; H01Q 21/12; H04J 13/0062
See application file for complete search history.

(56) References Cited

U.S. PATENT DOCUMENTS

| | | | |
|---|---|---|---|
| 2009/0247169 A1* | 10/2009 | Kawasaki | H04W 36/32 455/440 |
| 2009/0316653 A1* | 12/2009 | Meyer | H04W 74/0833 370/331 |
| 2010/0054235 A1* | 3/2010 | Kwon | H04J 13/16 370/350 |
| 2010/0273504 A1 | 10/2010 | Bull et al. | |
| 2012/0004009 A1 | 1/2012 | Lindoff et al. | |
| 2014/0016534 A1* | 1/2014 | Kim | H04W 74/0833 370/312 |
| 2014/0225775 A1 | 8/2014 | Clevorn et al. | |
| 2015/0016290 A1 | 1/2015 | Griesing et al. | |
| 2015/0065145 A1 | 3/2015 | Huang | |
| 2015/0141021 A1 | 5/2015 | Kapoulas et al. | |
| 2015/0156760 A1* | 6/2015 | Yu | H04W 72/042 370/330 |
| 2016/0325766 A1 | 11/2016 | Tsujita et al. | |
| 2016/0345221 A1 | 11/2016 | Axmon et al. | |
| 2017/0055297 A1* | 2/2017 | Da | H04J 13/0055 |
| 2017/0099175 A1 | 4/2017 | Tian et al. | |
| 2018/0167236 A1 | 6/2018 | Li et al. | |

OTHER PUBLICATIONS

PCT Written Opinion, dated Jan. 3, 2017, in connection with International Application No. PCT/EP2016/074459, all pages.
3GPP TSG RAN WG4 Meeting #75, R4-153659, Fukuoka, Japan, May 25-29, 2015, Modified arrangement for RRH based model, 8 pages.
3GPP TSG RAN WG4 Meeting #77, R4-157831, Anaheim, US, Nov. 16-20, 2015, Handover and Cell reselection in Unidirectional SFN, 4 pages.
Non-Final Office Action dated Aug. 28, 2018 in connection with U.S. Appl. No. 15/312,680, 31 pages.
3GPP TSG Ran Meeting #66, RP-141849, Maui, Hawaii (US), Dec. 8-12, 2014, Motivation of New SI proposal: Performance enhancements for high speed scenario, 4 pages.
3GPP TSG RAN WG4 Meeting #76bis, R4-155743, Sophia Antipolis, France, Oct. 12-16, 2015, Unidirectional RRH Arrangement for HST SFN, pp. 1-11.
3GPP TSG RAN WG4 Meeting #76bis, R4-155752, Sophia Anlipolis, France, Oct. 14-16, 2015, TP Simulation results for Unidirectional RRH arrangement, pp. 1-15.
3GPP TS 36.213 V12.6.0 Section 10.1.1 (Jun. 2006), 3rd Generation Partnership Project; Technical Specification Group Radio Access Network; Evolved Universal Terrestrial Radio Access (E-UTRA); Physical layer procedures (Release 12), 8 pages.
3GPP TS 36.211 V12.7.0 (Sep. 2015), 3rd Generation Partnership Project; Technical Specification Group Radio Access Network; Evolved Universal Terrestrial Radio Access (E-UTRA); Physical channels and modulation (Release 12), 136 pages.
3GPP TS 36.331 V12.6.0 (Jun. 2015), 3rd Generation Partnership Project; Technical Specification Group Radio Access Network; Evolved Universal Terrestrial Radio Access (E-UTRA); Radio Resource Control (RRC); Protocol specification (Release 12), 449 pages.
3GPP TR 36.878 V2.0.0 (Dec. 2015), 3rd Generation Partnership Project; Technical Specification Group Radio Access Network; Study on performance enhancements for high speed scenario in LTE (Release 13), 19 pages.
3GPP TSG-RAN WG4 Meeting #77, R4-158130, Anaheim, CA, US, Nov. 16-20, 2015, TP for TR 36.878: Uplink characteristics in Unidirectional RRH arrangement, 5 pages.
3GPP TSG RAN WG4 Meeting #77, R4-158133, Anaheim, US, Nov. 16-20, 2015, TP Handover and Cell reselection in Unidirectional SFN, 4 pages.
3GPP TSG RAN WG4 Meeting #76, R4-154518, Aug. 24-28, 2015, TP Unidirectional RRH arrangement, 5 pages.
3GPP TSG RAN WG4 Meeting #76, R4-154520, Aug. 24-28, 2015, Evaluation of Unidirectional RRH arrangement for HST SFN, 3 pages.
3GPP TSG RAN WG4 meeting #76bis, R4-155758, Sophia Antipolis, France, Oct. 14-16, 2015, Priority of controlling interruptions, 2 pages.
3GPP TSG RAN WG4 Meeting #76, R4-154516, Aug. 24-28, 2015, Modified RRH Arrangement for HST SFN, 13 pages.
3GPP TSG-RAN WG4 Meeting #74bis, R4-151365, Rio de Janiro, Brazil, Apr. 20-24, 2015, Modified arrangement for RRH based model, 3 pages.
PCT International Search Report, dated Jul. 14, 2016, in connection with International Application No. PCT/EP2016/052912, all pages.
PCT Written Opinion, dated Jul. 14, 2016, in connection with International Application No. PCT/EP2016/052912, all pages.
3GPP TR 36.878 V13.0.0 (Jan. 2016); 3rd Generation Partnership Project; Technical Specification Group Radio Access Network; Study on performance enhancements for high speed scenario in LTE (Release 13); 92 pages.
PCT International Search Report, dated Jul. 25, 2016, in connection with International Application No. PCT/EP2016/053105, all pages.
PCT Written Opinion, dated Jul. 25, 2016, in connection with International Application No. PCT/EP2016/053105, all pages.
3GPP TSG RAN WG4 Meeting #76bis, R4-156658, Handover in Unidirectional SFM, Sophia Antipolis, France, Oct. 14-16, 2015, 4 pages.
3GPP TSG RAN WG4 Meeting #77, R4-158132, TP Handover and Cell reselection in Unidirectional SFN, Anaheim, US, Nov. 16-20, 2015, 2 pages.

* cited by examiner

RANDOM ACCESS HANDLING IN SINGLE FREQUENCY NETWORK WITH UNIDIRECTIONAL ANTENNA NODE ARRANGEMENT

CROSS-REFERENCE TO RELATED APPLICATIONS

This application is a national stage application under 35 U.S.C. § 371 of PCT/EP2016/053105, filed Feb. 15, 2016, which claims the benefit of U.S. Provisional Application No. 62/252,629, filed Nov. 9, 2015, which applications are hereby incorporated herein by reference in their entireties.

TECHNICAL FIELD

The present invention relates to methods for handling random access in a high speed train (HST) environment, particularly in relation to a physical random access channel (PRACH) in a unidirectional remote radio head and single frequency network arrangement.

BACKGROUND

Wireless communication systems, i.e. systems that provide communication services to wireless communication devices such as mobile phones, smartphones etc. (often denoted by UE that is short for user equipment), have evolved during the last decade into systems that must utilize the radio spectrum in the most efficient manner possible. A reason for this is the ever increasing demand for high speed data communication capabilities in terms of, e.g., bitrate and to provide these capabilities at any given time, at any geographical location and also in scenarios where the wireless communication device is moving at a high speed, e.g., on board a high speed train.

To meet this demand, within the third generation partnership project, 3GPP, work is being done regarding possible enhancements to radio resource management, RRM, performance in high speed train environments. The justification is that there are railways such as Japan Tohoku Shinkansen (running at 320 km/h), German ICE (330 km/h), AGV Italo (400 km/h), and Shanghai Maglev (430 km/h) which vehicles travel at greater than 300 km/h and where there is demand for using mobile services. In a motivation contribution to 3GPP RAN#66, RP-141849, four scenarios of interest to wireless communication network operators are disclosed. In a number of these scenarios, there is a dedicated network to provide railway coverage of the cellular system; either as a standalone network, or used in conjunction with a public network which is not specifically designed to provide high speed train coverage.

Current standard specifications have partly taken UE speeds up to 300 km/h into account, but only in the context of data demodulation, not for cell detection. With increased deployment of high speed train lines, increased number of UE users, and increased usage of bandwidth per user, dominating network operators are requesting improved UE performance and support for speeds exceeding 300 km/h. Future high speed trains are expected to travel at speeds above 500 km/h, e.g. the Superconducting Magnetic Levitation train (SCMaglev) to be deployed in Japan, where train sets have already in April 2015 reached more than 600 km/h in speed tests.

For the development of the fifth generation of mobile telecommunication technology (5G), the International Telecommunication Union (ITU) has defined a set of requirements, IMT-2020, which includes the support of UE speeds of above 500 km/h with respect to mobility and data communication.

Apart from the relatively shortened time for detecting suitable neighbor cells for handover or cell reselection, high speed movement of the UE may also lead to significant Doppler shifts of the received radio signals. Such a Doppler shift forces the UE to increase its demodulation frequency when moving towards a cell (i.e. moving towards an antenna that defines a radio lobe of the cell), and decrease demodulation frequency when moving away from a cell, in order to maintain an acceptable receiver performance.

The Doppler shift can be expressed as:

$$\Delta f = f \left( \sqrt{\frac{1+\frac{v}{c}}{1-\frac{v}{c}}} - 1 \right)$$

or approximated as $$\Delta f = f \frac{v}{c}$$

when v is much smaller than c,
where c is the speed of light and v is the relative velocity of the UE towards the transmitting antenna. Referring to FIG. 1, an UE 101 is on a high speed train 103 on a railway track 104, connected to and moving away from cell A2 105 and quickly needs to detect cell B1 107 towards which the UE 101 is moving with a velocity $v_{UE}$ 109 of the train. According to current standard an antenna 111, 113 of a cell site can be as close as 2 m from the railway track 104, mainly motivated by that the wireless communication network would be integrated with the high-speed railway infrastructure. With an angle α between railway track 104 and a direction 106 to a cell antenna 113 and a UE velocity $v_{UE}$, the relative velocity v towards the transmitting antenna giving rise to Doppler shift is $v = v_{UE} \cos \alpha$.

The magnitude of the Doppler shift depends on the relative velocity of the UE 101 towards the transmitting antenna in a cell. Consequently, with transceivers located close to such a constrained path along which an UE is moving along a railway track, i.e., a small angle between the trajectory of the UE and the line between the UE and the transmitting antenna, a substantial part of the UE velocity will transfer into a Doppler shift. Moreover there will be an abrupt change of sign of the Doppler shift when the UE passes the transmitting antenna and the smaller the angle, the more abrupt is the change from positive to negative Doppler shift.

As part of 3GPP standardization work on improvements on performance in high speed train scenarios it has been proposed a new remote radio head (RRH) deployment for single frequency networks (SFN). This arrangement allows the UE to achieve a good downlink demodulation performance for UEs travelling at speeds up to (at least) 750 km/h.

In the Unidirectional RRH arrangement a UE experiences a nearly constant frequency offset on the downlink, caused by Doppler shift. Whether the frequency offset is positive or negative depends on whether the UE is travelling towards or away from the transmitting RRHs. For the scenario where downlink transmission (DLTX) and uplink reception (ULRX) beams are oriented in the same direction and hence have the same coverage the frequency offset on the uplink (UL) when the signal is received by the ULRX RRH becomes twice that of the one experienced on the downlink. However all UEs onboard the same train will display the same Doppler shift.

However, there remain some challenges in relation to random access prior art in HST scenarios. For example: when there are multiple groups of UEs in the cell with different Doppler characteristics, e.g., trains moving in two directions and/or stationary UEs along the track (passengers on a platform, maintenance workers) there may arise confusion in the PRACH detection since the relative frequency offset between UEs from different groups may be as large as four times the largest Doppler shift. This is considerably larger than can be handled with existing methodology which is based on restricting the set of cyclic shifts for UEs operating in a high speed scenario, as conveyed via an indicator in the PRACH configuration. The confusion arises since PRACH is using a smaller subcarrier distance than other physical channels; 1250 Hz instead of 15000 Hz. With frequency offsets of the received PRACH exceeding about ±1.5 subcarrier distances the received signal may look as another valid PRACH sequence than the one transmitted. This may lead to that a network node is responding to a UE that either doesn't exist or does exist but is not the intended receiver.

A recent proposal in the standardization, captured in 3GPP TS36.878 V12.0.0 section 6.5.3.1, involves a modification of the restricted set to allow even larger frequency offsets, but this approach will only address UEs following 3GPP long term evolution (LTE) Release 13 and onwards. For UEs of earlier releases, which will be dominating for many years to come, the proposal does not help. The problem is that those UEs will use PRACH sequences that have been removed—for a reason—in the new restricted set. Hence there will still be confusion.

In order to facilitate good performance in high speed train scenarios a robust network-based solution is needed for random access when groups of UEs have different Doppler characteristics. The solution needs to provide an acceptable performance for initial access when UE goes from idle to connected mode, and sustained performance for already connected UEs.

In case it is not clear from the context in which they appear, below follows a summary of abbreviations of some of the technical terms used in the description above.

| Abbreviation | Explanation |
| --- | --- |
| cDRX | Connected mode DRX |
| DL | downlink |
| DRX | Discontinuous reception |
| HST | High speed train |
| PRACH | Physical random access channel |
| RA | Random access |
| RAR | Random access response |
| RNTI | Radio network temporary identifier |
| RRC | Radio resource control |
| RRH | Remote radio head |
| RX | Receive |
| SFN | Single frequency network |
| TX | Transmission |
| UE | user equipment |
| UL | uplink |

SUMMARY

An object of the present disclosure is to at least mitigate at least some of the above described drawbacks related to prior art handling of random access.

Such an object is achieved, in one aspect by way of a method performed by a network node. The network node is connected to a plurality of antenna nodes that are located along a constrained path where a plurality of wireless communication devices are located. The method comprises controlling the antenna nodes to maintain reception radio lobes substantially along the path such that the wireless communication devices can perform uplink radio communication with the network node via the reception radio lobes. At least one radio frequency (RF) signal is detected in a PRACH, with a first PRACH configuration. A determination is made of a radio frequency offset of the detected RF signal.

A determination is then made that the at least one RF signal originates from a wireless communication device of a specific subset among the plurality of wireless communication devices. Each wireless communication device in the specific subset is associated with the radio frequency offset. A second PRACH configuration that is common to all wireless communication devices in the specific subset of wireless communication devices is then provided to the wireless communication device.

In other words, the present disclosure comprises detecting Doppler characteristics (i.e. frequency offset) of a UE during initial random access, assigning the UE to a group of UEs with the same Doppler characteristics, and reconfiguring the UE to use a PRACH configuration that is unique to said group of UEs.

The PRACH configurations (i.e. the second PRACH configurations) used by the network node, and provided to the wireless communication devices, are selected in such manner that PRACH transmissions from wireless communication devices of different groups do not interfere with each other. In other words, the PRACH configurations (including PRACH resources) are selected, depending on the PRACH subcarrier distance and the frequency offset between the groups, such that PRACH sequences from wireless communication devices of different groups are not likely to be confused. This may be achieved by selecting the different second PRACH configurations in such manner that the cross correlation is low even when the frequency offset between two groups of wireless communication devices is large, or using time-division or frequency-division multiplexing of the PRACH resource between the groups, or a combination thereof.

By using separate PRACH configurations for different groups of UEs the network node can use prior knowledge on frequency offset for the group when detecting PRACH. Moreover by consciously and carefully selecting at least two PRACH configurations used in the cell, false detections and missed detections for UEs in connected mode (doing random access (RA) to synchronize the UL timing in cDRX scenarios) can be significantly reduced. As a result the system performance as well as the user experience get improved.

As will be exemplified in the following, embodiments further includes exchange of group assignment for UE and group characteristics between network nodes at handover, and tunnelling of a PRACH configuration that is adapted by a target network node to take the UE group association into account.

In some embodiments, the determination of a radio frequency offset of the detected RF signal may comprise hypothesizing at least one radio frequency offset and obtaining information from the wireless communication device that entails a confirmation that the hypothesized at least one radio frequency offset is correct.

In such embodiments, the detection of the at least one RF signal in the PRACH may comprise a detected random access preamble identity, RAPID and further comprise a determination, based on the hypothesized at least one radio frequency offset, of at least one hypothesized RAPID. This at least one hypothesized RAPID, comprised in a message, may then be transmitted to the wireless communication device. Moreover, in these embodiments, the obtaining of information from the wireless communication device that entails a confirmation that the radio frequency offset is correct may comprise a reception, from the wireless communication device, a message that comprises information that confirms that the at least one hypothesized RAPID is equal to the detected RAPID.

In some embodiments, a plurality of further specific subsets among the plurality of wireless communication devices are associated with a respective further radio frequency offset. These embodiments comprise a determination of the second PRACH configuration based on subcarrier distance in the PRACH and based on differences in frequency offset between the specific subset and the further specific subsets. This determination is such that, subsequent to the provision of the second PRACH configuration, a determination of a RAPID from a wireless communication device of a first subset is related to a probability of being correct that is higher than a probability threshold.

The determination of the second PRACH configuration may in these embodiments be such that cross correlation between subsequently determined RAPID associated with respective specific subsets is below a correlation threshold value.

In some embodiments the method may comprise, subsequent to the provision of the second PRACH configuration, a detection of at least one further RF signal in a PRACH. A further radio frequency offset of the detected further RF signal is determined. A determination is then made that the at least one further RF signal originates from a wireless communication device of a specific subset among the plurality of wireless communication devices, in which specific subset each wireless communication devices is associated with a radio frequency offset that is different than the further radio frequency offset. The wireless communication device is then provided with further second PRACH configuration that is common to all wireless communication devices in a further specific subset of wireless communication devices. In this further specific subset each wireless communication devices is associated with this further radio frequency offset.

In some embodiments the method may comprise, subsequent to the provision of the second PRACH configuration, a detection that the wireless communication device is to be subject of a handover procedure. Information comprising identification of this specific subset of wireless communication devices and the second PRACH configuration is then provided to a second network node.

These embodiments may further comprise reception, from the second network node, of a handover message. This handover message is then provided to the wireless communication device.

Another aspect of the present disclosure is a network node configured to be connected to a plurality of antenna nodes that are located along a constrained path where a plurality of wireless communication devices are located. The network node comprises input/output circuitry, a processor and a memory. The memory contains instructions executable by said processor whereby the network node is operative to:
control the antenna nodes to maintain reception radio lobes substantially along the path such that the wireless communication devices can perform uplink radio communication with the network node via the reception radio lobes,
detect at least one radio frequency, RF, signal in a physical random access channel, PRACH, with a first PRACH configuration,
determine a radio frequency offset of the detected RF signal,
determine that said at least one RF signal originates from a wireless communication device of a specific subset among said plurality of wireless communication devices, in which specific subset each wireless communication devices is associated with said radio frequency offset, and
provide, to said wireless communication device, a second PRACH configuration that is common to all wireless communication devices in said specific subset of wireless communication devices.

Embodiments of the network node that correspond to the various method embodiments summarized above are also provided.

In another aspect there is provided a computer program, comprising instructions which, when executed on at least one processor in a network node, cause the network node to carry out the method as summarized above in connection with the first aspect and the various embodiments of this aspect.

In another aspect there is provided a carrier comprising a computer program according to the summarized aspect above, wherein the carrier is one of an electronic signal, an optical signal, a radio signal and a computer readable storage medium.

These other aspects provide the same effects and advantages as summarized above in connection with the method of the first aspect.

DETAILED DESCRIPTION

Figure 2:
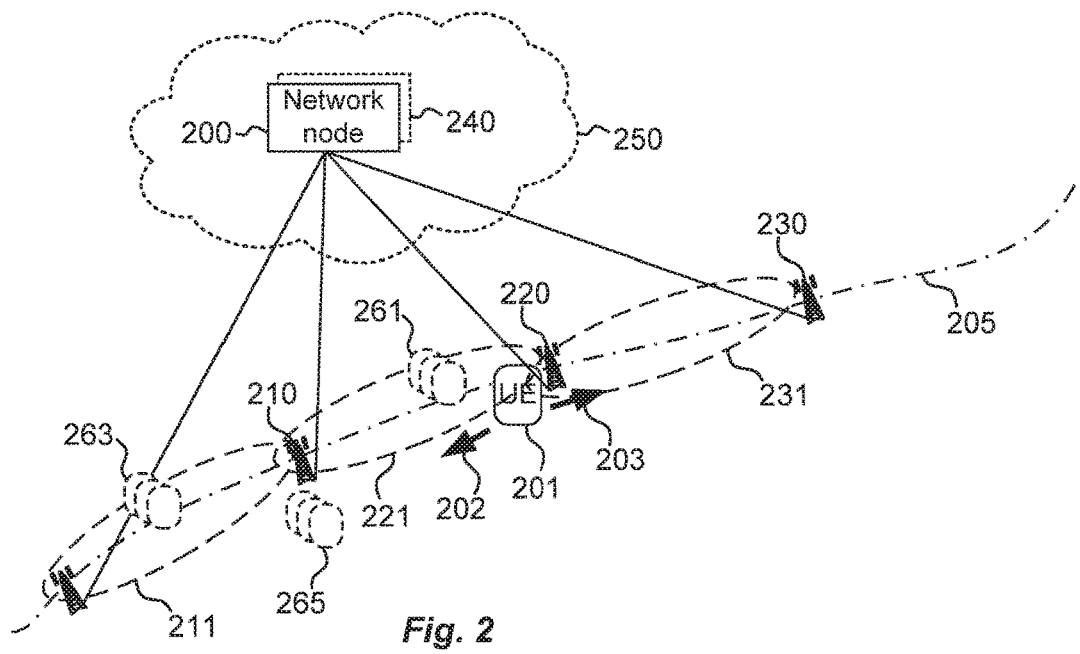

In FIG. 2, a network node 200 is connected to a plurality of antenna nodes 210, 220, 230 that are located along a constrained path 205 where a plurality of wireless communication devices, including a wireless communication device 201, are located, the wireless communication device 201 may be in motion as indicated by a velocity vector 202 in a first movement direction and a velocity vector 203 in a second movement direction that is opposite the first movement direction. The path 205 is constrained in that the antenna nodes 210, 220, 230 are located close to the path 205 and as a consequence there is typically a small angle between the trajectory (i.e. movement direction) of a wireless communication device and a line between the wireless communication device and the antenna node.

FIG. 2 further illustrates a plurality of other wireless communication devices, including groups or subsets 261, 263, 265 of wireless communication devices that are located such that they are either moving or being more or less stationary, i.e. non-moving, as discussed above.

The antenna nodes 210, 220, 230 are controlled to maintain a respective reception radio lobe 211, 221, 231. As the skilled person will realize, the antenna nodes 210, 220, 230 may also maintain respective transmission radio lobes. Such transmission radio lobes are omitted from FIG. 2 for the sake of avoiding unnecessary detail when illustrating the embodiments of the present disclosure. The lobes 211, 221, 231 are substantially along the path 205 such that the wireless communication device 201 during movement along the path 205, can communicate with the network node 200 via consecutive reception radio lobes. When moving in the direction defined by velocity vector 202, the wireless communication device 201 communicates via consecutive reception radio lobes 231, 221, 211 of consecutive antenna nodes 230, 220, 210 behind the wireless communication device 201. Conversely, when moving in the direction defined by velocity vector 203, the wireless communication device 201 communicates via consecutive reception radio lobes 211, 221, 231 of consecutive antenna nodes 210, 220, 230 ahead of the wireless communication device 201. When moving in any direction 202, 203 RF signals transmitted by the wireless communication device 201 will be subject to a Doppler frequency shift when detected via a reception radio lobe maintained by an antenna node such as any of the antenna nodes 210, 220, 230.

As indicated in FIG. 2, it is to be noted that the network node 200 may be considered as a single entity as well as a combination of a plurality of entities 240. For example, the network node 200 may be distributed, in terms of functionality as well as in terms of physical hardware, over one or more processing units that are residing in a logical entity 250 that may be defined as a "cloud".

As will be exemplified below, the network node 200 may also be in the form of a node in a 3GPP long term evolution (LTE) system.

Figure 3:
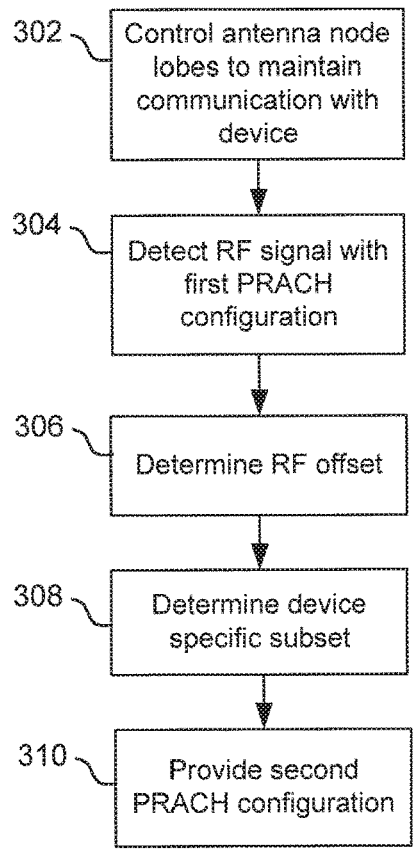
FIG. 3 is a flowchart of a method.

Turning now to FIG. 3, and with continued reference to FIG. 2, a method will be described with reference to a number of actions that are performed by a network node, such as the network node 200.

Action 302

The antenna nodes 210, 220, 230 are controlled to maintain reception radio lobes 211, 221, 231. The lobes 211, 221, 231 are substantially along the path 205 such that the wireless communication devices 201, 261, 263, 265 can perform uplink radio communication with the network node 200 via the reception radio lobes 211, 221, 231.

Action 304

A detection is made of at least one radio frequency (RF) signal in a PRACH. The PRACH has a first PRACH configuration.

Action 306

A determination is then made of a radio frequency offset of the detected RF signal.

Action 308

A determination is then made that the at least one RF signal detected in action 304, originates from a wireless communication device 201 of a specific subset 261, 263, 265 among the plurality of wireless communication devices. In this specific subset, each wireless communication device is associated with the radio frequency offset that was determined in action 306.

Action 310

A second PRACH configuration that is common to all wireless communication devices in the specific subset of wireless communication devices is then provided to the wireless communication device 201.

For example, and as will be exemplified in further detail below, the determination of the radio frequency offset of the detected RF signal may comprise hypothesizing at least one radio frequency offset, and obtaining information from the wireless communication device that entails a confirmation that the hypothesized radio frequency offset is correct.

In these examples, the detection of the at least one RF signal in the PRACH may comprise a detected random access preamble identity, RAPID. In such cases, a determination is made, based on the hypothesized at least one radio frequency offset, of at least one hypothesized RAPID. A transmission is then made, to the wireless communication device, of a message that comprises the at least one hypothesized RAPID. The obtaining of information from the wireless communication device that entails a confirmation that the radio frequency offset is correct may then comprise receiving, from the wireless communication device, a message comprising information that confirms that the at least one hypothesized RAPID is equal to the detected RAPID.

It is to be noted that there may exist a plurality of further specific subsets among the plurality of wireless communication devices that are associated with a respective further radio frequency offset. Such cases may involve determining, based on subcarrier distance in the PRACH and based on differences in frequency offset between the specific subset and the further specific subsets, the second PRACH configuration such that, subsequent to the provision of the second PRACH configuration (in action 310), determination of a RAPID from a wireless communication device of a first subset is related to a probability of being correct that is higher than a probability threshold.

Here, it is to be noted that the determination of said second PRACH configuration may for example be such that cross correlation between subsequently determined RAPID associated with respective specific subsets is below a correlation threshold value.

Figure 4:
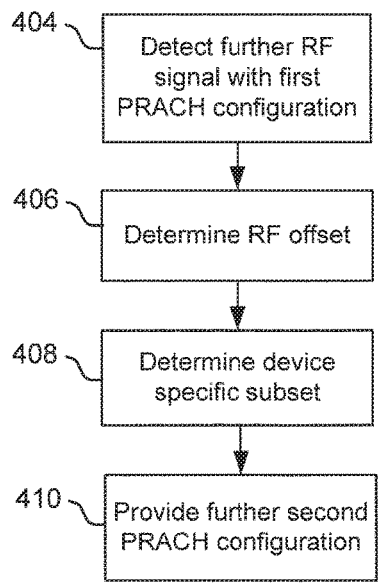
FIG. 4 is a flowchart of a method,
FIG. 5 schematically illustrates a HST scenario.

Now with reference to FIG. 4 and with continued reference to FIG. 2, a context will be exemplified which may be seen as a wireless communication device changing group/subset assignment subsequent to having been provided (in action 310) with the second PRACH configuration.

Action 404

A detection is made of at least one further RF signal in a PRACH.

Action 406

A determination is then made of a further radio frequency offset of the detected further RF signal.

Action 408

A determination is then made that the at least one further RF signal detected in action 404, originates from a wireless communication device 201 of a specific subset 261, 263, 265 among the plurality of wireless communication devices. In this specific subset, each wireless communication device is associated with a radio frequency offset that is different than the further radio frequency offset that was determined in action 406.

Action 410

A further second PRACH configuration that is common to all wireless communication devices in a further specific subset of wireless communication devices is then provided to the wireless communication device 201. In this further specific subset, each wireless communication device is associated with the further radio frequency offset.

Figure 5:
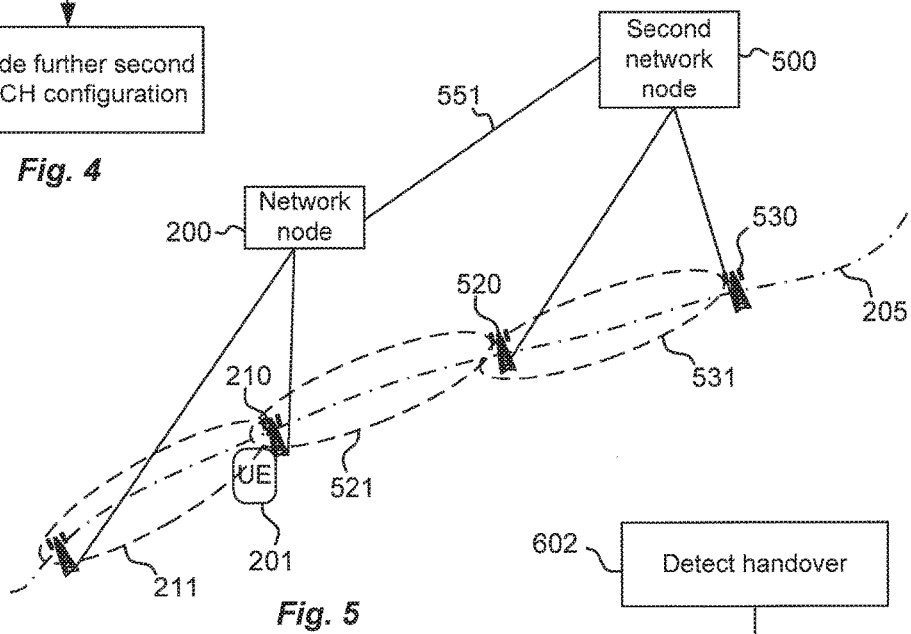
Figure 6:
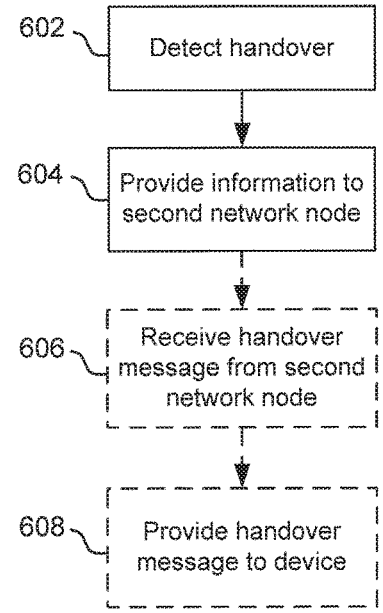
FIG. 6 is a flowchart of a method.

Now with reference to FIG. 5 and FIG. 6, and with continued reference to FIG. 2, a context will be exemplified which involves a handover of a wireless communication device. Handover may, as the skilled person will realize, involve at least a second network node in addition to the network node 200 illustrated in FIG. 2. Such an example is exemplified in FIG. 5a where the network node 200 and a second network node 500 are connected to respective antenna nodes 210, 520, 530. The network node 200 and the second network node 500 are connected via a connection 551 that may be a so-called X2 connection, as will be exemplified below in connection with FIG. 15. The actions performed by the network node 200 comprise:

Action 602

A detection is made that the wireless communication device 201 is to be subject of a handover procedure. As the skilled person will realize, such a detection may be based on various conditions.

Action 604

Information comprising identification of the specific subset of wireless communication devices with which the wireless communication device 201 is associated and comprising the second PRACH configuration is then provided to the second network node 500.

Action 606

A handover message may then be received from the second network node 500.

Action 608

The handover message is then provided to the wireless communication device 201.

In some more detail, embodiments described herein illustrate that a network node (e.g. eNodeB) 200 may provide a first PRACH configuration (Cfg) via SIB2 broadcast for the wireless communication device (e.g. UE) 201 to use when carrying out a first random access to go from idle mode to connected mode. When the wireless communication device 201 needs access, it sends a random access request, RA, to the network node 200 using the first PRACH configuration. The network node 200 responds with a Random access response, RAR. The UE 201 may acknowledge the RAR with an acknowledgement message ACK (as will be exemplified in some more detail below).

During the first random access the network node 200 determines the Doppler characteristics (in terms of radio frequency offset) of the wireless communication device 201, and assigns it to a group of such devices with similar characteristics. The network node 200 has prepared at least one second PRACH configuration to be used by the at least on group a UE can be assigned to. After the random access response (RAR) has been acknowledged by the wireless communication device (as will be exemplified in some more detail below), the network node 200 may send a RRC connection reconfiguration message to the wireless communication device 201 containing a second PRACH configuration that is different from the first PRACH configuration and specific to wireless communication devices in that particular group. To the wireless communication device 201 this looks like a handover where source and target cells are the same. The wireless communication device 201 may acknowledges the RRC with an acknowledgement message ACK using the second PRACH configuration ($2^{nd}$ PRACH Cfg, as will be exemplified in some more detail below).

The network node 200 has prepared as many second PRACH configurations as groups that it supports simultaneously. The different second PRACH configurations are characterized by low cross correlation even under large frequency errors. Alternatively or in combination the PRACH configurations may use non-overlapping time resources, i.e. using time-division multiplexing of the PRACH resource between the groups. The wireless communication device 201 will use this second PRACH configuration for random access RA as long as it remains in RRC connected mode or gets reconfigured by the network node 200. Thus, PRACH sequences from different groups are not likely to be confused.

Generally the network 200 node monitors the PRACH for random access requests and distinguishes between first and second PRACH configurations. The first PRACH configuration is used by wireless communication devices for initial access for determining Doppler characteristics and group assignment. As described below the initial access procedure is also used after a wireless communication device has switched to RRC idle mode and left its group. The second PRACH configuration is used by wireless communication devices for access while in RRC connected mode as described above. It should be noted that the network node 200 may select and handle a plurality of second PRACH configurations simultaneously. Thus there may be a plurality of wireless communication device groups, each group with one distinct second PRACH configuration.

Generally, a wireless communication device is added to a group when going from RRC idle mode to RRC connected mode. Further, a wireless communication device is removed from a group when going from RRC connected mode to RRC idle mode.

When the network node 200 is detecting PRACH transmissions from wireless communication devices that have been assigned to a particular group, and where the cause of the random access may be to reestablish the UL timing e.g. after a long DRX, it compensates beforehand for the frequency offset for this group. Due to group-specific configuration the network node does not have to care about individual wireless communication devices that may have other Doppler characteristics. This reduces the risks for missed detection and false detection and hence facilitates a better system performance and user experience.

In case the network node determines to move the wireless communication device 201 from one group to another, it reconfigures PRACH for that device correspondingly. In other words, when changing groups, the wireless communication device 201 is switched from one second PRACH configuration to another second PRACH configuration (i.e. a further second PRACH configuration) which is associated with the new group.

At handover between cells within the same SFN group, which hence is not visible to the wireless device, the source network node 200 provides information to the target network node (e.g. the second network node 500) on which groups exist, what characteristics they have, the associated PRACH configurations, and the wireless devices associated with each group.

At handover between cells in different SFN groups, which hence looks like a regular handover to the wireless communication device 201, the source cell (e.g. the network node 200) sends information to the target cell (e.g. the second network node 500) on defined groups, characteristics of each group, and to which group the one or more wireless communication devices belong. The source cell (e.g. the network node 200) then adapts the PRACH configuration that is provided to each device via tunneling accordingly.

Hence when a wireless communication device carries out random access in the target cell to confirm the handover and to establish UL synchronization it uses a second PRACH configuration that is unique to the group to which the wireless communication device belongs. The network node (e.g. the second network node 500) then detects the PRACH transmission as outlined herein.

When the wireless communication device 201 is to be released to idle mode the network node 200 sends a RRC Connection Release message. This message may contain Redirection information containing a SIB2 with a first PRACH configuration applicable for the SFN cell group that the wireless communication device 201 is served by. When the wireless communication device 201 later performs a random access it is then carried out according to initial random access as mentioned herein.

Figure 7A:
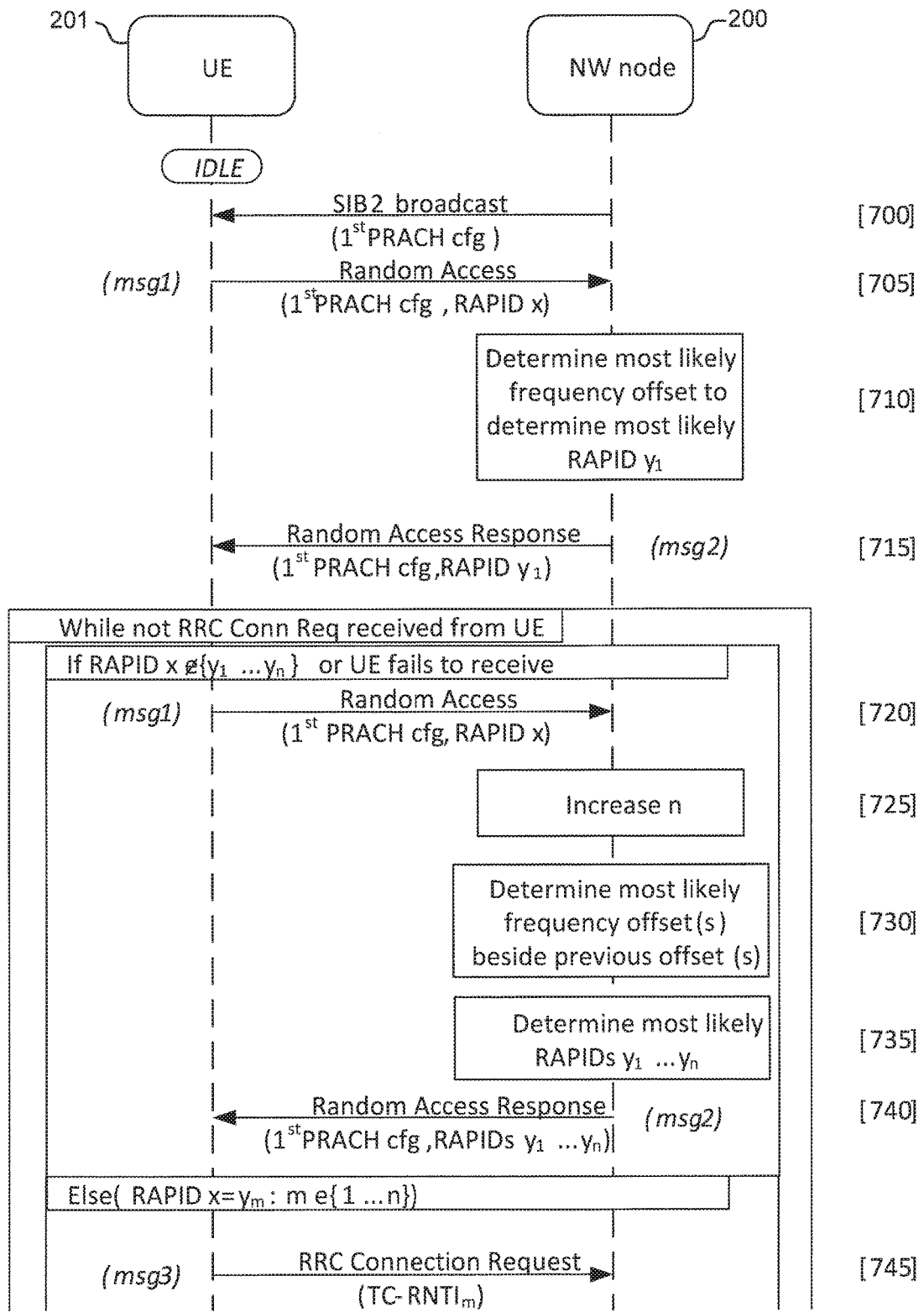
FIG. 7a-b is a combined signaling diagram and flowchart of a method.
Figure 7B:
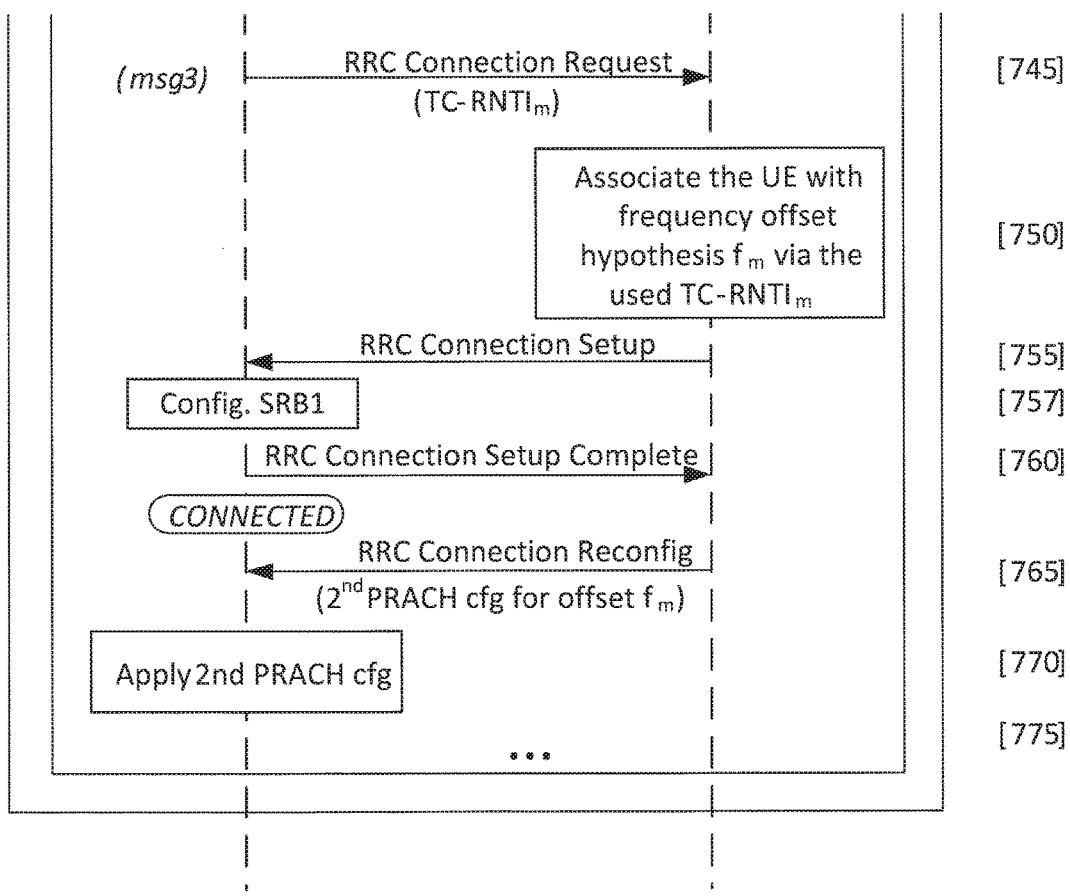

Turning now to FIG. 7 (being split into 7a and 7b on separate drawings for reasons of readability), an embodiment of initial access carried out by a UE (represented by the wireless communication device 201) in idle mode is described.

FIG. 7 illustrates how the network node 200 handles the wireless communication device 201 that carries out an initial random access (going from idle mode to connected mode) and potentially has a large frequency offset.

The wireless communication device 201 receives system information block SIB2 that is broadcasted by the network and which contains a PRACH configuration (action 700). This PRACH configuration is herein referred to as the 1st PRACH configuration.

When the wireless communication device 201 carries out random access (action 705) it does so according to the 1st PRACH configuration. It selects a Random Access Preamble Identity (RAPID) (x) and transmits an associated PRACH preamble to the network node 200. This message is often referred to as message 1 (msg1) in the literature about random access.

The network node 200 receives the information transmitted on PRACH (by which action 710 commences). The received information may have been subjected to a frequency offset, caused either by Doppler shift, an incorrect transmission frequency by the wireless communication device 201, or both. In the case of Unidirectional SFN the Doppler shift on the downlink causes the wireless communication device 201 to use an incorrect transmission frequency. The signal transmitted by the wireless communication device 201 on the uplink is subjected to a Doppler shift, too, resulting in that the frequency offset experienced by the network node 200 when receiving the PRACH preamble is twice the Doppler shift.

The network node, being aware of in which environment it is operating, determines (during action 710) based on group associations for already connected UEs, the most likely frequency offset the currently unknown wireless communication device 201 is associated with. In other words, the network node 200 hypothesizes a frequency offset (cf. action 306 discussed above). Most likely may for instance be determined from which group of wireless communication devices is the largest in the part of the cell where the PRACH preamble is received or received with highest power. The network node 200 determines the RAPID based on the most likely frequency offset. Determines here implies that the network node 200 is compensating for the frequency offset in the PRACH detection, either before or after it carries out correlation towards the set of possible PRACH preambles in the 1st PRACH configuration.

The network node 200 sends a Random Access Response (often referred to as message 2) where it addresses the wireless communication device 201 by the RAPID (y1) it has determined, and provides a Temporary C-RNTI (TC-RNTI) for the wireless communication device 201 to use in the further communication (action 715).

Scenario 1: Immediate Success (Actions 745-775)

In case the RAPID determined by the network node 200 (y1) matches the RAPID used by the wireless communication device 201 (x), and the wireless communication device 201 is able to receive the Random Access Response, the wireless communication device 201 will send a RRC Connection Request to the network node 200 (action 745). This message (often referred to as message 3) is sent in uplink resources that have been allocated for the wireless communication device 201 with identity TC-RNTI.

The network node 200 receives the RRC Connection Request sent for the wireless communication device 201 with identity TC-RNTI, and thereby can deduce that its assumption on frequency offset was correct. In other words, the network node 200 realizes that the hypothesized frequency offset (cf. action 306 discussed above) was correct. Thereby the network node 200 can associate the wireless communication device 201 with a group of wireless communication devices having such frequency offset. (action 750)

The network node 200 sends a RRC Connection Setup message to the wireless communication device 201 (action 755). The wireless communication device 201 receives the message and configures a first signal radio bearer (SRB1) accordingly (action 757). Thereafter it sends a RRC Connection Setup Complete message to the network node 200 (action 760) by which it enters connected mode. The temporary C-RNTI is now promoted to C-RNTI.

Upon having received the RRC Connection Setup Complete message from the wireless communication device 201, the network node 200 sends a 2nd PRACH configuration to the wireless communication device 201 to replace the 1st PRACH configuration (action 765). The 2nd PRACH configuration is reserved for UEs within the particular group to which the wireless communication device 201 is associated. There thus are several 2nd PRACH configurations—one for each defined group of UEs. The new PRACH configuration may be carried in a RRC Connection Reconfiguration message.

Upon receiving the RRC Connection Reconfiguration message (action 770) the wireless communication device 201 applies the new configuration (including the PRACH configuration) and carries out a standardized procedure associated with reception of RRC Connection Reconfiguration. Thereafter it carries on with whatever was the reason for the random access (action 775).

Scenario 2: The Complement (Actions 720-740)

If the RAPID (y1) determined by the network node 200 does not match the RAPID (x) used by the wireless communication device 201, the wireless communication device 201 will not respond to the Random Access Response. Instead it will resend the PRACH preamble, potentially at higher power, once the time duration ("window") for which it shall monitor PDCCH for a Random Access Response has expired (action 720).

The network node 200, which has noticed that it did not get an RRC Connection Request from the UE with temporary identity TC-RNTI, detects a retransmission by the wireless communication device 201 with the same RAPID as before when decoded under the same frequency offset hypothesis (cf. action 306 discussed above). It deduces that it might have assumed the wrong frequency offset and hence determined an incorrect RAPID (y1), but it cannot rule out that the wireless communication device 201 had problems with reception on the downlink and therefore might not have been able to receive the Random Access Response. Hence it increases the number of frequency offset hypotheses (action 725) and determines the 1 to n most likely frequency offsets (action 730) and determines the RAPIDs under those hypotheses. Potentially it leads to different RAPIDs (y1 . . . yn) (action 735).

The network node 200 then sends one or more Random Access Responses to the wireless communication device 201, carrying one or more RAPIDs and for each RAPID a unique associated TC-RNTI and a unique uplink resource allocation (action 740).

In case any of those RAPIDs (y1 . . . yn) matches the RAPID used by the wireless communication device 201 (x), the wireless communication device 201 will send an RRC Connection Request message in the uplink resource associated with the correct RAPID and correct TC-RNTI (action 745). It then continues as described above.

In case there is still no match, the network node 200 may increase the number of frequency offset hypotheses further (in action 725) and continue from there.

When the wireless communication device 201 has transmitted the PRACH preamble a max number of times provided in SIB2, it will give up and bar that cell for some time, e.g. 12 minutes, to prevent it from further loading a presumably overloaded cell (often referred to as device aggression management). This needs to be considered when specifying the 1st PRACH configuration to prevent that UEs are being blocked out as a consequence of the iterative approach to determine the frequency offset.

Figure 8A:
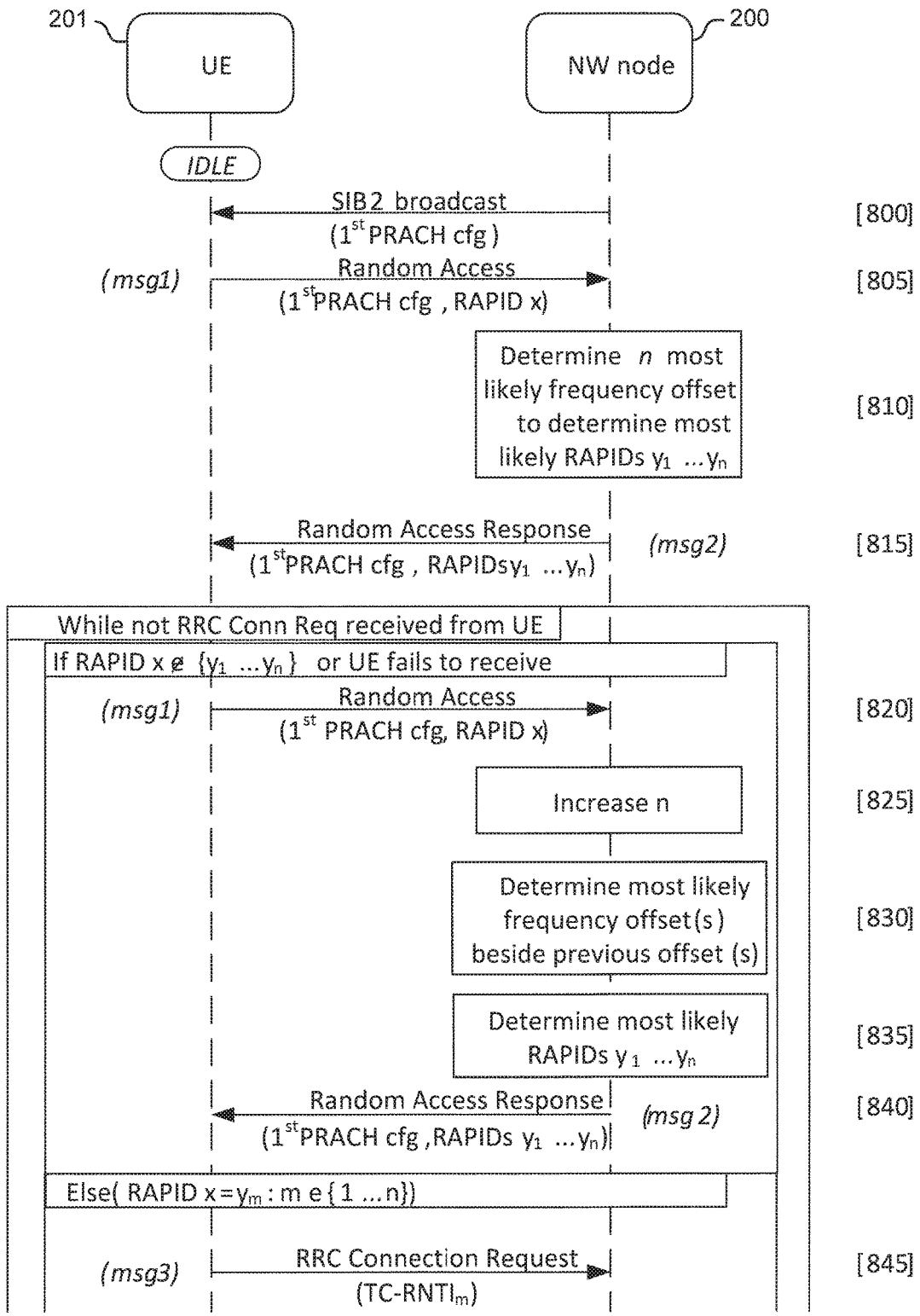
FIG. 8a-b is a combined signaling diagram and flowchart of a method.
Figure 8B:
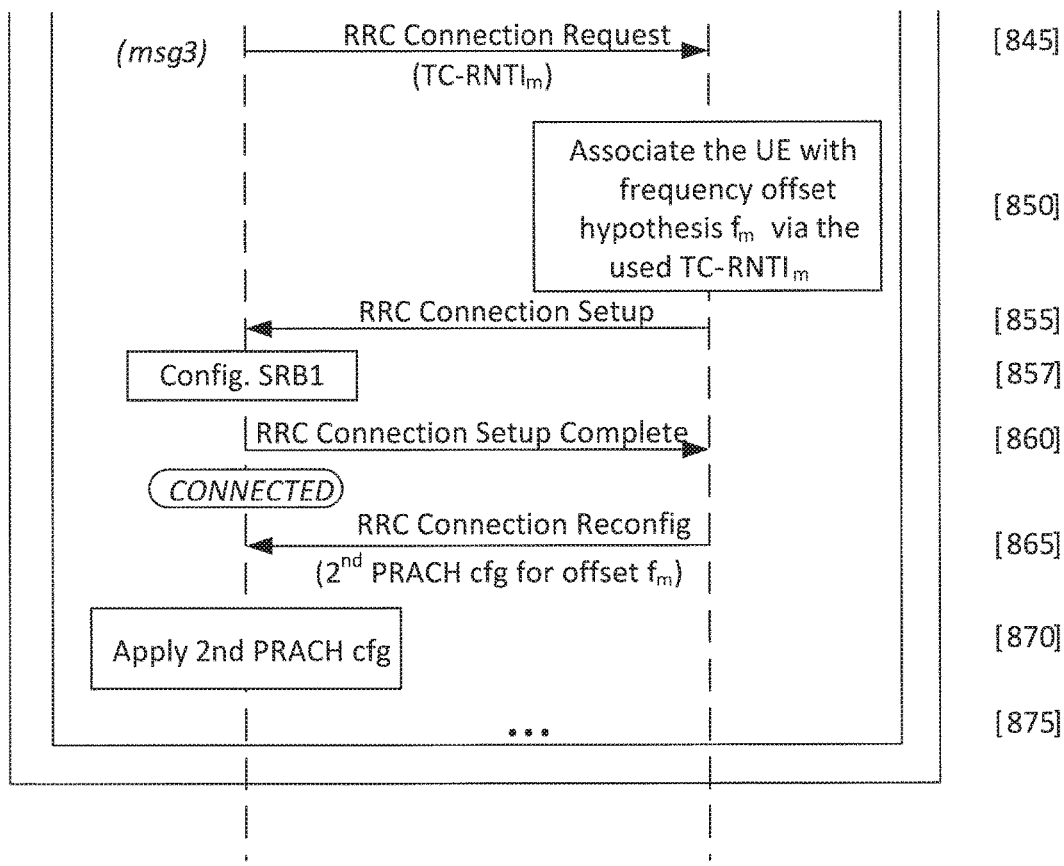

Turning now to FIG. 8 (being split into 8*a* and 8*b* on separate drawings for reasons of readability), an alternative solution to the one described in FIG. 7.

It is to be noted that each of the actions 800 to 875 correspond to respective actions 700 to 775 discussed above in connection with FIG. 7, where only a few actions differ as follows:

The difference is that in action 810 more than one frequency offset is hypothesized (cf. action 306 discussed above), leading to that potentially more than one RAPID is determined for the wireless communication device 201, and the first Random Access Response thus may carry more than one RAPID and associated TC-RNTI and uplink allocation (action 815). Besides this the flow is as described for FIG. 7 above.

It shall be noted that both FIG. 7 and FIG. 8 describes the situation when no contention resolution is needed. The flow in FIGS. 7 and 8 can easily be modified to accommodate also contention resolution. The flows above are merely to show some exemplifying embodiments.

For example, in FIG. 7 one and the same RAPID is resent. But in embodiments involving contention-based random access, the RAPID is selected randomly by the wireless communication device each time it makes a new preamble transmission. In such embodiments, the network node detects any new preamble within the range of back-off times for the retransmission as a possible preamble retransmission.

Turning now to FIGS. 9 to 14, additional embodiments will be described in some detail. Similar to the embodiments discussed above, the network node 200 interacts with the wireless communication device 201.

Figure 9:
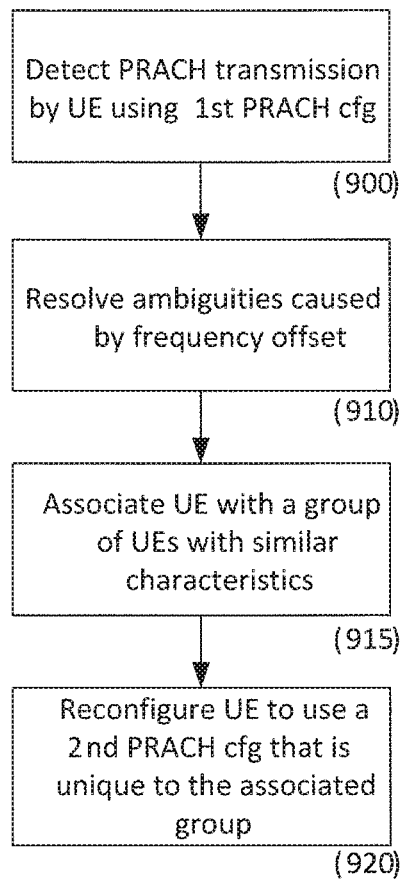
FIG. 9 is a flowchart of a method.

FIG. 9 illustrates steps in the network node 200. The network node 200 monitors PRACH according to 1st PRACH configuration and detects PRACH preambles sent by UEs that have not been associated with a group yet (action 900).

The network node 200 resolves ambiguities regarding frequency offsets and RAPIDs, as described in connection with FIGS. 7 and 8 (action 910).

After having determined the frequency offset and associated RAPID, the network node 200 associated the wireless communication device 201 with a group of UEs with similar characteristics. In some scenarios this wireless communication device 201 may become the first wireless communication device in a group (action 915).

The network node 200 picks a 2nd PRACH configuration to be used by UEs in said group, and sends a reconfiguration message to the wireless communication device 201 (action 920).

Figure 10:
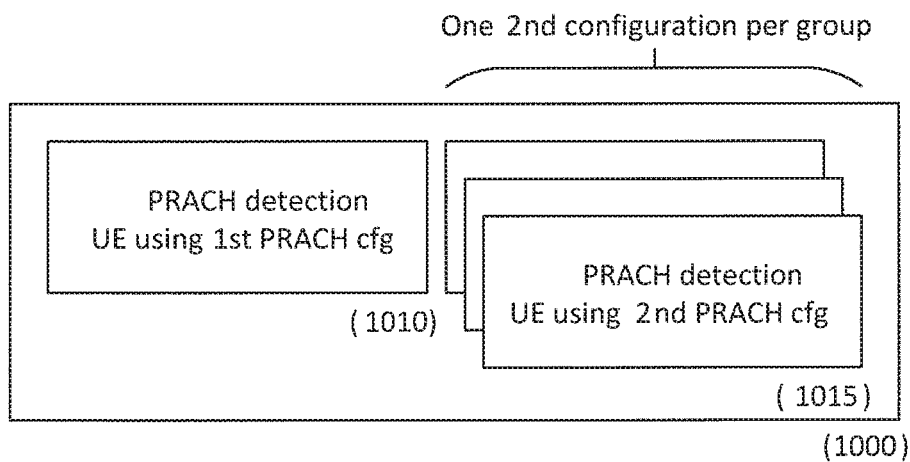
FIG. 10 is a schematically illustrated functional block diagram of network node functionality.

FIG. 10 illustrates functionality in a network node (which may correspond to the network node 200 discussed above) for concurrent monitoring of several PRACH channels (function block 1000). The network node is configured to always monitor the 1st PRACH channel, defined by the 1st PRACH configuration (function block 1010), and may monitor one or more 2nd PRACH channels, defined by 2nd PRACH configurations (function blocks 1015).

Figure 11:
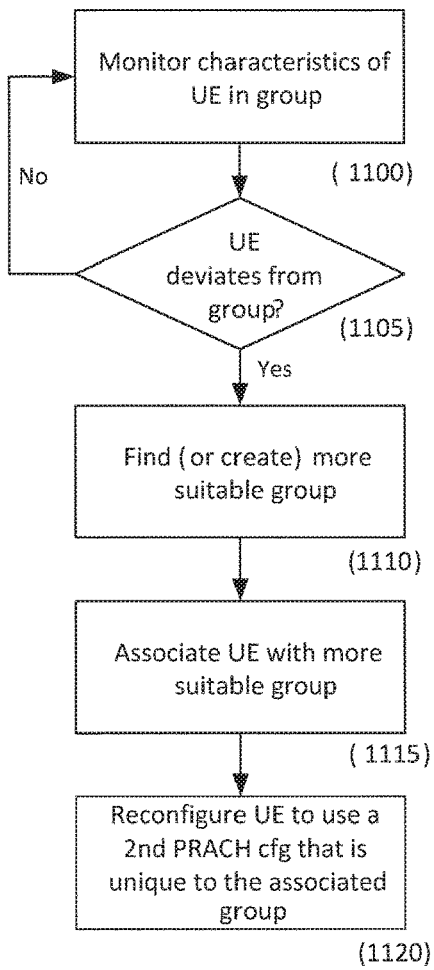
FIGS. 11 to 14 are flowcharts of methods,
FIG. 15 schematically illustrates a wireless communication system,
FIG. 16 schematically illustrates functional blocks in a network node and in antenna nodes,
FIG. 17 schematically illustrates a network node, and
FIG. 18 schematically illustrates a network node.

FIG. 11 illustrates a method in a network node (e.g. the network node 200 discussed above) that once it has assigned a wireless communication device (e.g. the wireless communication device 201 discussed above) to a group, monitors the frequency offset (e.g. by detection based on PUCCH, PUSCH, SRS and/or UL-RS) (action 1100). The embodiment of the method in FIG. 11 illustrates a similar context, and may be considered as a variation of the embodiment, of the method described above in connection with FIG. 4. In case the network node detects that the frequency offset characteristics of the wireless communication device deviates from the average characteristics of the group of wireless communication devices by, say, some absolute or relative threshold value (action 1105:YES), it determines a more suitable group to associate the wireless communication device with (action 1110). In case such group does not exist it may create a new group for the wireless communication device. It then associates the wireless communication device with the more suitable group (action 1115) and reconfigures the 2nd PRACH configuration to be used by the wireless communication device accordingly (action 1120).

Figure 1:
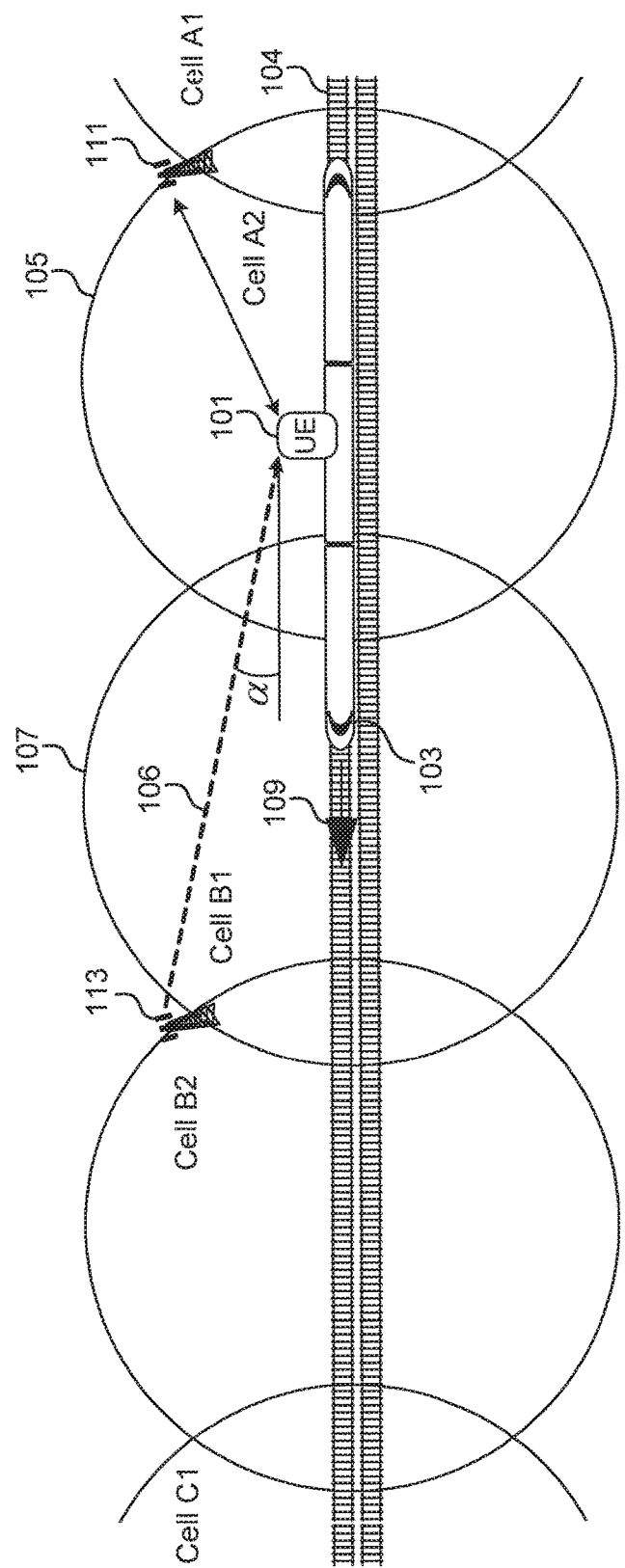
FIG. 1 schematically illustrates a HST scenario,
FIG. 2 schematically illustrates a HST scenario.
Figure 12:
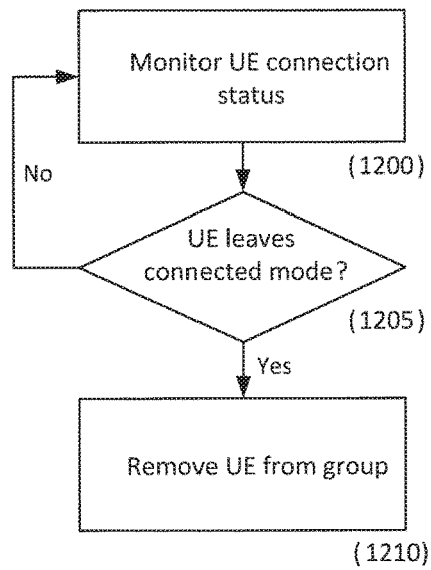

FIG. 12 illustrates a method in a network node (e.g. the network node 200 discussed above) monitoring the wireless communication device (e.g. the wireless communication device 201 discussed above) connection status (action 1200). In case the wireless communication device leaves connected mode (action 1205:YES), the network node disassociates the wireless communication device with the group (action 1210). The reason is that once the wireless communication device gets to connected mode it is assumed to use the common 1st PRACH configuration provided in the system information (SIB2). Moreover the network node no longer can monitor the frequency offset of the wireless communication device and hence cannot tell when the wireless communication device starts to deviate from the average characteristics of the group to which it was associated (e.g. leaving the train at a station—cf. FIG. 1).

Figure 13:
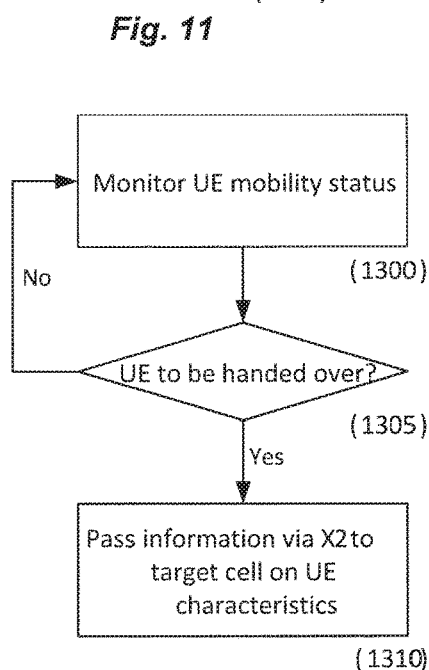

FIG. 13 illustrates a method in a source network node (e.g. the network node 200 discussed in connection with FIG. 5) monitoring the mobility status of the wireless communication device (action 1300). In other words, the embodiment of the method in FIG. 13 illustrates a similar context, and may be considered as a variation of the embodiment, of the method described above in connection with FIG. 5 and FIG. 6. Once it is determined that the wireless communication device is to be handed over to a neighboring target cell (action 1305:YES), the source network node conveys information on frequency offset characteristics for said UE to the network node (e.g. the second network node 500 discussed in connection with FIG. 5) managing the target cell. This may be signaled over the X2 interface using the standardized mobility information container whose content can be proprietary and hence can be tailored for the needs (action 1310).

Figure 14:
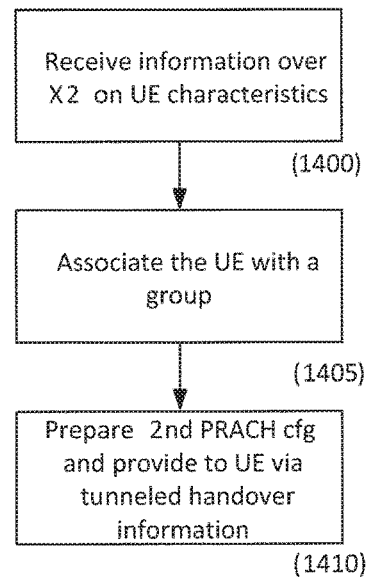

FIG. 14 illustrates a method in a network node (e.g. the second network node 500 discussed in connection with FIG. 5) to which the wireless communication device is to be handed over. The network node receives mobility information over the X2 interface, where the information includes the frequency offset characteristics of the wireless communication device to be handed over (action 1400).

Upon receiving the information about the wireless communication device, the network node associates the wireless communication device with a suitable group of UEs (action 1405), and then prepares a handover message that is tunneled to the wireless communication device via the source network node (e.g. the network node 200 discussed in connection with FIG. 5), where the handover message contains a 2nd PRACH configuration for the wireless communication device to use when carrying out random access after the handover (action 1410).

Figure 15:
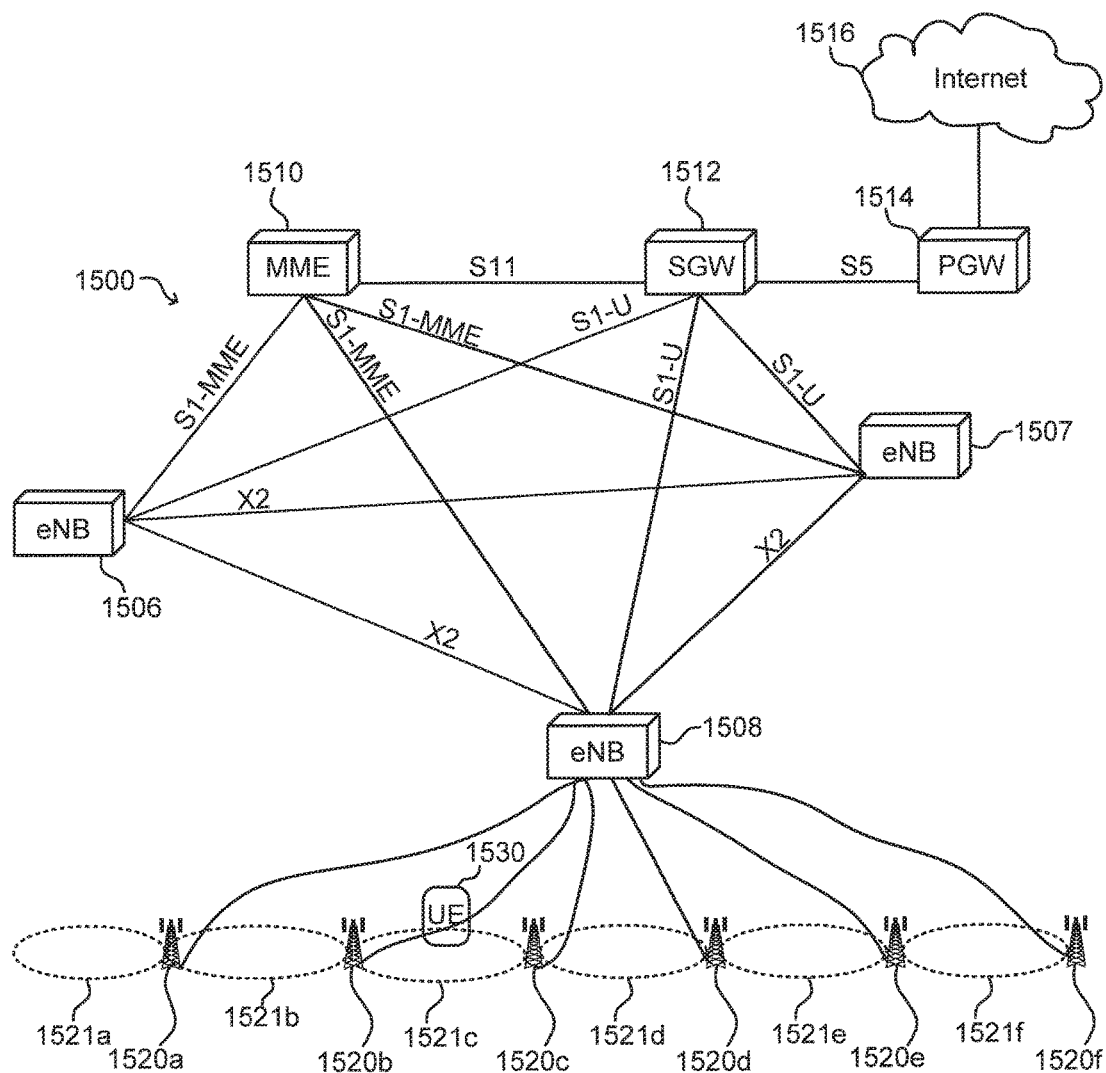

Turning now to FIG. 15, which illustrates parts of a 3GPP long term evolution, LTE, wireless network 1500 and a compatible core network. Base stations (enhanced NodeB, eNodeB or eNB) 1506, 1507, 1508 are communicating with each other over an X2 interface. The base stations 1506, 1507 and 1508 are connected to a mobility management entity, MME, 1510, which keeps information about UEs (i.e. UE contexts) regarding capabilities etc., which the MME 1510 shares, e.g., with base stations connected to it. The MME 1510 is also managing handover of a UE from one MME to another when a UE leaves the pool of base stations managed by a source MME, or when the X2 connection is missing between the source and target base stations.

The base stations 1506, 1507 and 1508 are further connected to a serving gateway, SGW, 1512, which is handling the user data plane transport to and from the base station to which a UE is connected, and to one or more packet data network gateways, PGW, 1514, which connect UEs to the internet 1516. The MME in whose pool of base stations a UE resides configures which base station the SGW shall connect to for transport of the UE user plane data.

In FIG. 15, the base station 1508 is a network node as defined above and the base station/network node 1508 is connected to a number of antenna nodes 1520a-f. The base station/network node 1508 controls the antenna nodes 1520a-f as discussed herein and thereby maintaining respective radio lobes 1521a-f. A UE 1530 is illustrated, which may correspond to any wireless communication device described herein.

Processing of signals, as exemplified above, may be handled by a single network node such as an eNodeB (as indicated in FIG. 15) using antenna nodes in the form of remote radio heads, RRH, or remote radio units, RRU, for the individual radio lobes 1521a-f. Processing of signals may in other embodiments be handled by a group of eNodeBs with or without RRHs or RRUs operating in a cooperative manner, or such group of eNodeBs under coordination of another network node, either a new entity or an existing one with extended functionality, e.g. an MME.

Figure 16:
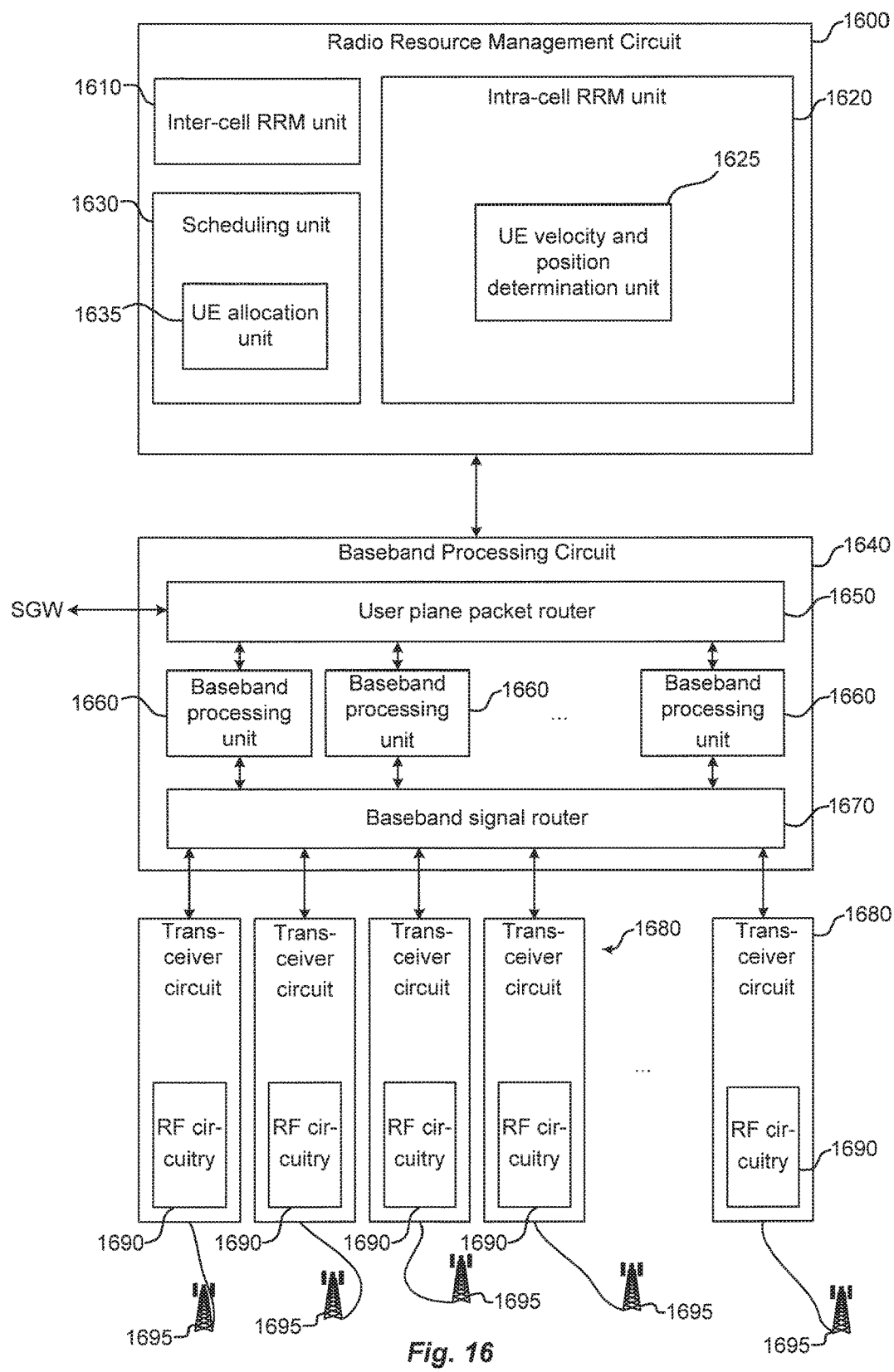

Turning now to FIG. 16, an example of arrangements, in the form of functional blocks, in a network node will be described in some more detail. The arrangements in FIG. 16 may be comprised in any of the network nodes discussed above in connection with FIGS. 2 to 15.

A radio resource management (RRM) circuit 1600 comprises an Inter-cell RRM unit 1610 for handling information and processing in relation to mobility of wireless communication devices between cells in a wireless communication network, e.g. a single frequency network (SFN), where cells may have one and the same or different physical cell identities.

An intra-cell RRM unit 1620 is comprised in the RRM circuit 1600, the intra-cell RRM unit 1620 being capable of handling information and processing in relation to mobility within a cell (e.g. part of a SFN cell) managed by this network node, e.g. eNodeB.

A scheduling unit 1630 is configured, in addition to scheduling operations that are outside of the present disclosure, to handle random access actions as described herein.

The Intra-RRM unit further comprises a velocity and position determination unit 1625 that is configured to determine position and velocity of wireless communication devices based on various kinds of measurements (e.g. as discussed herein).

A baseband processing unit 1640 comprises one or more baseband processing units 1660 connected to a SGW via a user plane packet router 1650, and connected to transceiver circuits 1680 comprising RF circuitry 1690 via a baseband signal router 1670. Connection with antenna nodes 1695 is realized via the transceiver circuits 1680.

Figure 17:
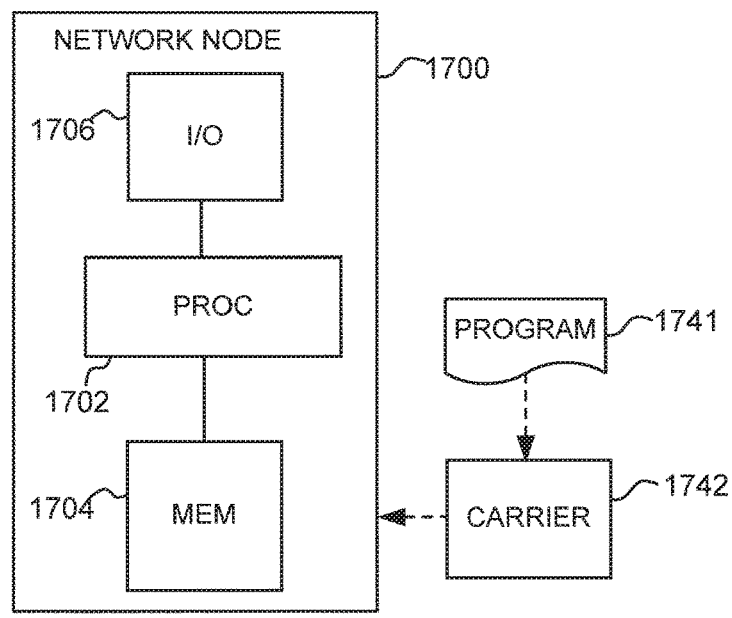

Turning now to FIG. 17, a schematically illustrated network node 1700 will be described in some more detail. The network node 1700 is configured to be connected to a plurality of antenna nodes that are located along a constrained path where a plurality of wireless communication devices are located. The network node 1700 comprises input/output circuitry 1706, a processor 1702 and a memory 1704. The memory 1704 contains instructions executable by the processor 1702 whereby the network node 1700 is operative to:

control the antenna nodes to maintain reception radio lobes substantially along the path such that the wireless communication devices can perform uplink radio communication with the network node via the reception radio lobes, detect at least one radio frequency, RF, signal in a physical random access channel, PRACH, with a first PRACH configuration, determine a radio frequency offset of the detected RF signal, determine that said at least one RF signal originates from a wireless communication device of a specific subset among said plurality of wireless communication devices, in which specific subset each wireless communication devices is associated with said radio frequency offset, and provide, to said wireless communication device, a second PRACH configuration that is common to all wireless communication devices in said specific subset of wireless communication devices.

The instructions that are executable by the processor 1702 may be software in the form of a computer program 1741. The computer program 1741 may be contained in or by a carrier 1742, which may provide the computer program 1741 to the memory 1704 and processor 1702. The carrier 1742 may be in any suitable form including an electronic signal, an optical signal, a radio signal or a computer readable storage medium.

In some embodiments, the network node is operative such that the determination of a radio frequency offset of the detected RF signal comprises:
hypothesizing at least one radio frequency offset, and
obtaining information from the wireless communication device that entails a confirmation that the hypothesized at least one radio frequency offset is correct.

In some embodiments, the network node is operative such that the detection of the at least one RF signal in the PRACH comprises a detected random access preamble identity, RAPID, and further operative to:
determine, based on the hypothesized at least one radio frequency offset, at least one hypothesized RAPID,
transmit, to the wireless communication device, a message comprising the at least one hypothesized RAPID, and wherein the obtaining of information from the wireless communication device that entails a confirmation that the radio frequency offset is correct comprises:
receive, from the wireless communication device, a message comprising information that confirms that the at least one hypothesized RAPID is equal to the detected RAPID.

In some embodiments, the network node is operative such that a plurality of further specific subsets among the plurality of wireless communication devices are associated with a respective further radio frequency offset, and further operative to:
determine, based on subcarrier distance in the PRACH and based on differences in frequency offset between the specific subset and the further specific subsets, said second PRACH configuration such that, subsequent to said provision of said second PRACH configuration, determination of a RAPID from a wireless communication device of a first subset is related to a probability of being correct that is higher than a probability threshold. In some embodiments, the network node is operative such that the determination of said second PRACH configuration is such that cross correlation between subsequently determined RAPID associated with respective specific subsets is below a correlation threshold value.

In some embodiments, the network node is operative, subsequent to said provision of said second PRACH configuration, to:
detect at least one further RF signal in a physical random access channel, PRACH,
determine a further radio frequency offset of the detected further RF signal,
determine that said at least one further RF signal originates from a wireless communication device of a specific subset among said plurality of wireless communication devices, in which specific subset each wireless communication devices is associated with a radio frequency offset that is different than the further radio frequency offset, and
provide, to said wireless communication device, further second PRACH configuration that is common to all wireless communication devices in a further specific subset of wireless communication devices in which further specific subset each wireless communication device is associated with said further radio frequency offset.

In some embodiments, the network node is operative, subsequent to said provision of said second PRACH configuration, to:
detect that the wireless communication device is to be subject of a handover procedure, and
provide, to a second network node, information comprising identification of said specific subset of wireless communication devices and said second PRACH configuration.

In some embodiments, the network node is operative to:
receive, from the second network node, a handover message, and
provide, to the wireless communication device, said handover message.

Figure 18:
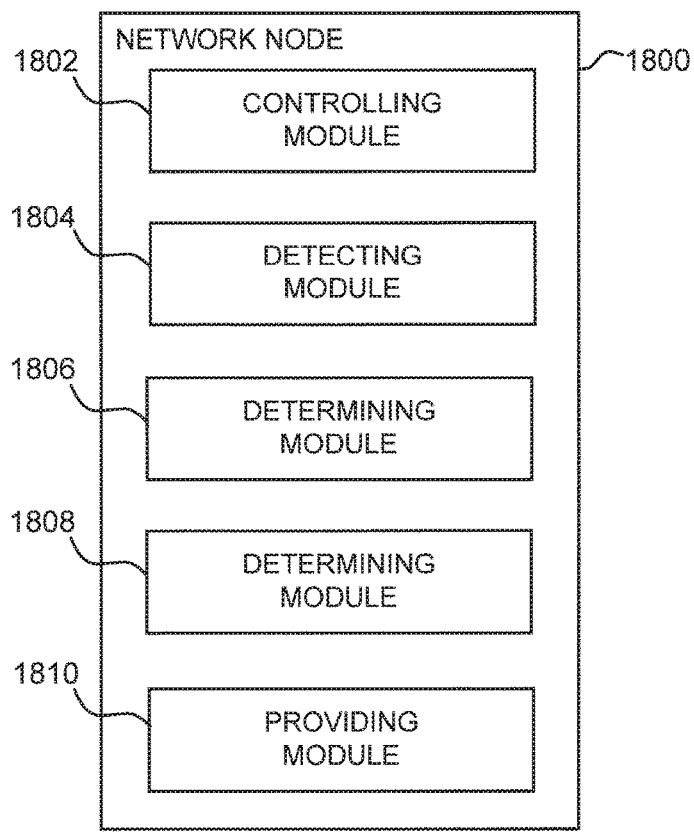

FIG. 18, illustrates schematically a network node 1800 that comprises:
a controlling module 1802 configured to control the antenna nodes to maintain reception radio lobes substantially along a constrained path such that the wireless communication devices can perform uplink radio communication with the network node via the reception radio lobes,
a detecting module 1804 configured to detect at least one radio frequency, RF, signal in a physical random access channel, PRACH, with a first PRACH configuration,
a determining module 1806 configured to determine a radio frequency offset of the detected RF signal,
a determining module 1808 configured to determine that said at least one RF signal originates from a wireless communication device of a specific subset among said plurality of wireless communication devices, in which specific subset each wireless communication devices is associated with said radio frequency offset, and
a providing module 1810 configured to provide, to said wireless communication device, a second PRACH configuration that is common to all wireless communication devices in said specific subset of wireless communication devices.

The network node 1800 may comprise further modules that are configured to perform in a similar manner as, e.g., the network node 1700 described above in connection with FIG. 17.

To summarize, various embodiments and examples have been described above. These examples and variations of these examples may be summarized as follows:

1. A method for PRACH configuration and detection in a network node, the method comprising:
broadcasting a first PRACH configuration to be used by wireless communication devices when performing random access when in idle mode;
detecting random access performed by a wireless communication device using the first PRACH configuration;
detecting frequency offset characteristics displayed by the wireless communication device in the random access using the first PRACH configuration;
selecting a second PRACH configuration based on the frequency offset characteristics displayed by the wireless communication device;
if the frequency offset characteristics of the wireless communication device fulfills a condition, for example if the frequency offset is larger than a threshold, configuring the wireless communication device with the second PRACH configuration to be used by wireless communication devices when performing random access when in connected mode.

2. A method as under 1, wherein groups of wireless communication devices are formed, such that within a group, the wireless communication devices display similar frequency offset characteristics.

3. A method as under 2, wherein the second PRACH configurations are selected, depending on the PRACH subcarrier distance and the frequency offset characteristics between the groups, such that second PRACH sequences from different groups are not likely to be confused with one another.

4. A method as under 3, wherein the second PRACH configurations are selected in such manner that the cross correlation is low even when the frequency offset between two groups of wireless communication devices is large, and/or using time-division multiplexing of the PRACH resource between the groups.

5. A method as under any one of 2-4, wherein the network node monitors the frequency offset characteristics of a wireless communication device and determines to move the wireless communication device from one group to a new group; and the wireless communication device is switched from one second PRACH configuration to another second PRACH configuration which is associated with the new group.

6. A method as under any one of 2-5, wherein if a handover between cells is imminent, the network node in the role of source network node provides information directed to a target network node on group information, for example which groups exist, what characteristics they have, the associated PRACH configurations, and the wireless devices associated with each group.

7. A method as under 6, wherein, if the handover is between cells in different SFN groups, the network node in the role of source network node of the source cell sends information directed to the target cell 8. A method as under 7, wherein the network node in the role of network node of the source cell then adapts the second PRACH configuration to each device via tunneling accordingly, for use when a wireless communication device carries out random access in the target cell to confirm the handover and to establish UL synchronization.

9. A network node configured to operate according to any of the exemplary methods set forth above.

The invention claimed is:

1. A method performed by a network node, where the network node is connected to a plurality of antenna nodes that are located along a constrained path where a plurality of wireless communication devices are located, the method comprising:
   controlling the antenna nodes to maintain reception radio lobes substantially along the path such that the wireless communication devices can perform uplink radio communication with the network node via the reception radio lobes;
   detecting at least one radio frequency, RF, signal in a physical random access channel, PRACH, with a first PRACH configuration;
   determining a radio frequency offset of the detected RF signal;
   determining that said at least one RF signal originates from a wireless communication device of a specific subset among said plurality of wireless communication devices, in which specific subset each wireless communication devices is associated with said radio frequency offset; and
   in response to determining that said at least one RF signal originates from the wireless device of the specific subset of wireless communication devices, providing, to said wireless communication device, a second PRACH configuration that is common to all wireless communication devices in said specific subset of wireless communication devices.

2. The method of claim 1, wherein the determination of a radio frequency offset of the detected RF signal comprises:
   hypothesizing at least one radio frequency offset; and
   obtaining information from the wireless communication device that entails a confirmation that the hypothesized at least one radio frequency offset is correct.

3. The method of claim 2, wherein the detection of the at least one RF signal in the PRACH comprises a detected random access preamble identity, RAPID, and further comprising:
   determining, based on the hypothesized at least one radio frequency offset, at least one hypothesized RAPID;
   transmitting, to the wireless communication device, a message comprising the at least one hypothesized RAPID, and
   wherein the obtaining of information from the wireless communication device that entails a confirmation that the radio frequency offset is correct comprises:
   receiving, from the wireless communication device, a message comprising information that confirms that the at least one hypothesized RAPID is equal to the detected RAPID.

4. The method of claim 3, wherein a plurality of further specific subsets among the plurality of wireless communication devices are associated with a respective further radio frequency offset, and comprising:
   determining, based on subcarrier distance in the PRACH and based on differences in frequency offset between the specific subset and the further specific subsets, said second PRACH configuration such that, subsequent to said provision of said second PRACH configuration, determination of a RAPID from a wireless communication device of a first subset is related to a probability of being correct that is higher than a probability threshold.

5. The method of claim 4, wherein the determination of said second PRACH configuration is such that cross correlation between subsequently determined RAPID associated with respective specific subsets is below a correlation threshold value.

6. The method of claim 1, comprising, subsequent to said provision of said second PRACH configuration:
   detecting at least one further RF signal in a physical random access channel, PRACH;
   determining a further radio frequency offset of the detected further RF signal;
   determining that said at least one further RF signal originates from the wireless communication device of the specific subset among said plurality of wireless communication devices, in which specific subset each wireless communication devices is associated with a radio frequency offset that is different than the further radio frequency offset; and
   providing, to said wireless communication device, further second PRACH configuration that is common to all wireless communication devices in a further specific subset of wireless communication devices in which further specific subset each wireless communication device is associated with said further radio frequency offset.

7. The method of claim 1, comprising, subsequent to said provision of said second PRACH configuration:
- detecting that the wireless communication device is to be subject of a handover procedure; and
- providing, to a second network node, information comprising identification of said specific subset of wireless communication devices and said second PRACH configuration.

8. The method of claim 7, comprising:
- receiving, from the second network node, a handover message; and
- providing, to the wireless communication device, said handover message.

9. A network node configured to be connected to a plurality of antenna nodes that are located along a constrained path where a plurality of wireless communication devices are located, the network node comprising input/output circuitry, a processor and a memory, said memory containing instructions executable by said processor whereby said network node is operative to:
- control the antenna nodes to maintain reception radio lobes substantially along the path such that the wireless communication devices can perform uplink radio communication with the network node via the reception radio lobes;
- detect at least one radio frequency, RF, signal in a physical random access channel, PRACH, with a first PRACH configuration;
- determine a radio frequency offset of the detected RF signal;
- determine that said at least one RF signal originates from a wireless communication device of a specific subset among said plurality of wireless communication devices, in which specific subset each wireless communication devices is associated with said radio frequency offset; and
- in response to a determination that said at least one RF signal originates from the wireless device of the specific subset of wireless communication devices, provide, to said wireless communication device, a second PRACH configuration that is common to all wireless communication devices in said specific subset of wireless communication devices.

10. The network node of claim 9, operative such that the determination of a radio frequency offset of the detected RF signal comprises:
- hypothesizing at least one radio frequency offset; and
- obtaining information from the wireless communication device that entails a confirmation that the hypothesized at least one radio frequency offset is correct.

11. The network node of claim 10, operative such that the detection of the at least one RF signal in the PRACH comprises a detected random access preamble identity, RAPID, and further operative to:
- determine, based on the hypothesized at least one radio frequency offset, at least one hypothesized RAPID;
- transmit, to the wireless communication device, a message comprising the at least one hypothesized RAPID; and
- wherein the obtaining of information from the wireless communication device that entails a confirmation that the radio frequency offset is correct comprises:
- receive, from the wireless communication device, a message comprising information that confirms that the at least one hypothesized RAPID is equal to the detected RAPID.

12. The network node of claim 11, operative such that a plurality of further specific subsets among the plurality of wireless communication devices are associated with a respective further radio frequency offset, and further operative to:
- determine, based on subcarrier distance in the PRACH and based on differences in frequency offset between the specific subset and the further specific subsets, said second PRACH configuration such that, subsequent to said provision of said second PRACH configuration, determination of a RAPID from a wireless communication device of a first subset is related to a probability of being correct that is higher than a probability threshold.

13. The network node of claim 12, operative such that the determination of said second PRACH configuration is such that cross correlation between subsequently determined RAPID associated with respective specific subsets is below a correlation threshold value.

14. The network node of claim 9, operative, subsequent to said provision of said second PRACH configuration, to:
- detect at least one further RF signal in a physical random access channel, PRACH;
- determine a further radio frequency offset of the detected further RF signal;
- determine that said at least one further RF signal originates from the wireless communication device of the specific subset among said plurality of wireless communication devices, in which specific subset each wireless communication devices is associated with a radio frequency offset that is different than the further radio frequency offset; and
- provide, to said wireless communication device, further second PRACH configuration that is common to all wireless communication devices in a further specific subset of wireless communication devices in which further specific subset each wireless communication device is associated with said further radio frequency offset.

15. The network node of claim 9, operative, subsequent to said provision of said second PRACH configuration, to:
- detect that the wireless communication device is to be subject of a handover procedure; and
- provide, to a second network node, information comprising identification of said specific subset of wireless communication devices and said second PRACH configuration.

16. The network node of claim 15, operative to:
- receive, from the second network node, a handover message; and
- provide, to the wireless communication device, said handover message.

17. A nontransitory computer readable storage medium comprising a computer program comprising instructions which, when executed on at least one processor in a network node, cause the network node to carry out a method, wherein the network node is connected to a plurality of antenna nodes that are located along a constrained path where a plurality of wireless communication devices are located, and wherein the method comprises:
- controlling the antenna nodes to maintain reception radio lobes substantially along the path such that the wireless communication devices can perform uplink radio communication with the network node via the reception radio lobes;

detecting at least one radio frequency, RF, signal in a physical random access channel, PRACH, with a first PRACH configuration;

determining a radio frequency offset of the detected RF signal;

determining that said at least one RF signal originates from a wireless communication device of a specific subset among said plurality of wireless communication devices, in which specific subset each wireless communication devices is associated with said radio frequency offset; and in response to determining that said at least one RF signal originates from the wireless device of the specific subset of wireless communication devices, providing, to said wireless communication device, a second PRACH configuration that is common to all wireless communication devices in said specific subset of wireless communication devices.

* * * * *